J. Carlin.
Plate Holder.
Nº 98,923.  Patented Jan. 18, 1870.
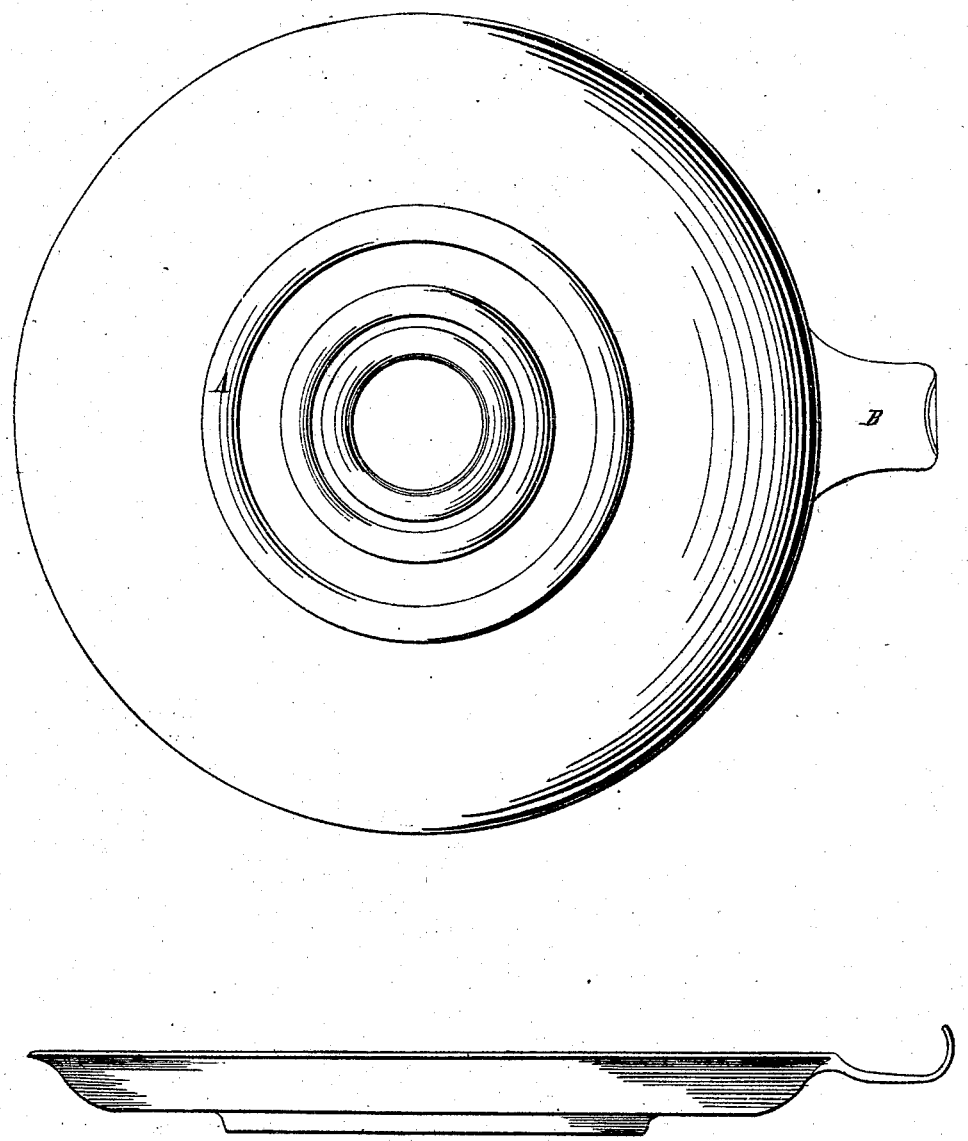
Witnesses
Nathan C. Ely
Wm H Riblet
Inventor
John Carlin

United States Patent Office.

JOHN CARLIN, OF NEW YORK, N. Y.

Letters Patent No. 98,923, dated January 18, 1870.

IMPROVEMENT IN PLATE-HOLDER.

Schedule referred to in these Letters Patent and making part of the same

To all whom it may concern:

Be it known that I, JOHN CARLIN, of New York city, in the county of New York, and State of New York, have invented a new commodity; and I do hereby declare that the following is a full and exact description thereof, reference being had to the accompanying drawings, and to the letters of reference marked thereon.

The nature of my invention consists of a round salver without a brim, of any metal, as silver, Britannia, or japanned metal, and of any size, and of any depth, with three circular rounded grooves, five-eighths of an inch wide, and three-eighths of an inch deep, at the bottom of the plate-holder, and a handle of the same metal, and somewhat thicker than the salver, more or less than one inch wide, and from one inch to two inches long, and projecting from the border of the plate-holder, and turning up in a curve corresponding with the shape of the human thumb.

The grooves are made expressly to allow the falling in of the base ridges of the plates, saucers, cups, bowls, and the like, in order to keep the plates, &c., steady in standing; and the handle is thus shaped expressly to give a firm and easy position to the thumb in pressing against it, while the palm and fingers are sustaining the base of the plate-holder.

The object of the said plate-holder is to benefit persons sitting or standing away from the table, by holding their plates, or anything else containing eatables or beverages, and to catch the food, refreshment, or beverage that happens to slip off the plate or cup, thus protecting the holder's dress.

Besides what is already held in, this commodity also enables the holder to place within its limits any eatables, such as bread, cakes, pastries, &c.

What I claim as my improvement, as an article of manufacture, is—

The plate-holder, with grooves, A, of different diameters, and the handle B, all from one piece of metal, as shown and described.

JOHN CARLIN.

Witnesses:
NATHAN C. ELY,
WM. H. RIBLET.